March 1, 1949.   O. S. FIELD ET AL   2,463,094
AIRPLANE COURSE INDICATING SYSTEM
Filed Jan. 11, 1944   2 Sheets-Sheet 1
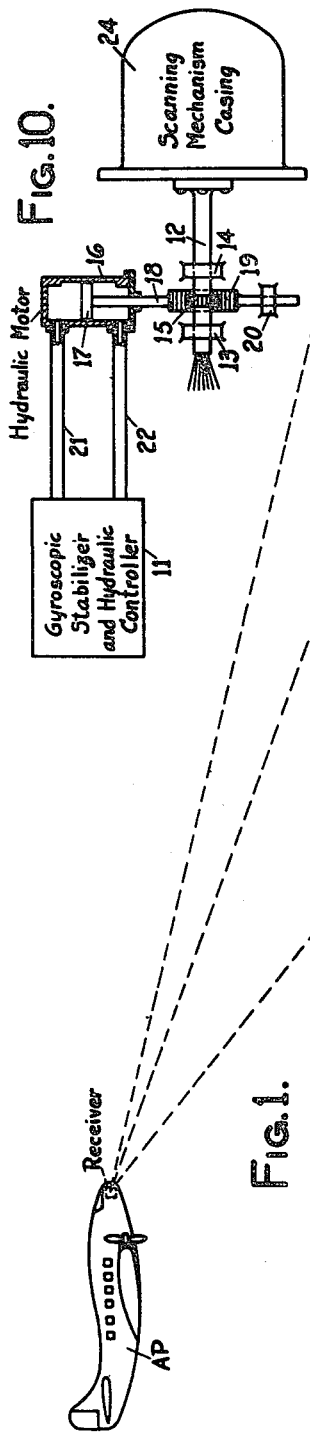
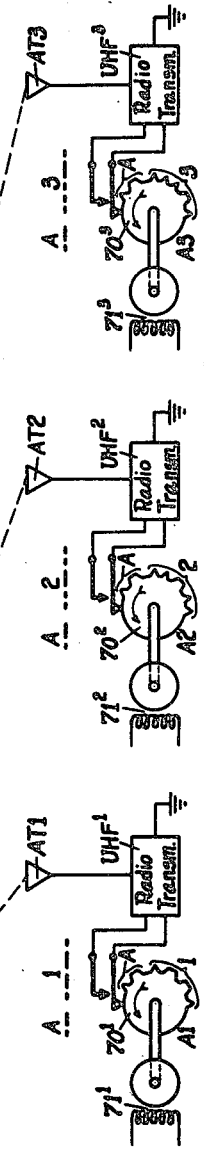
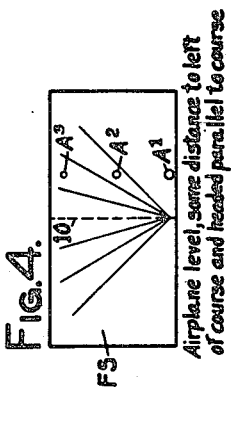
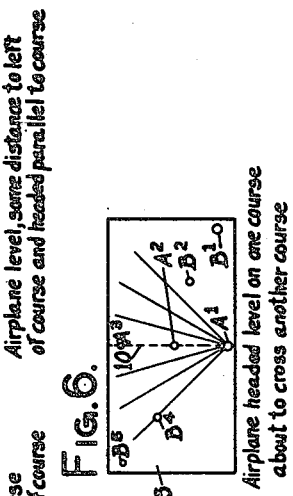
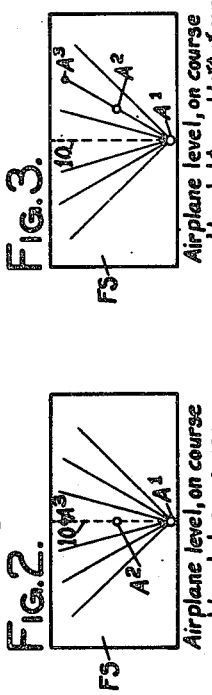
Inventors
O.S. Field, S.N. Wight and S.P. Saint
By Neil W. Preston,
Their Attorney March 1, 1949.   O. S. FIELD ET AL   2,463,094
AIRPLANE COURSE INDICATING SYSTEM
Filed Jan. 11, 1944   2 Sheets-Sheet 2
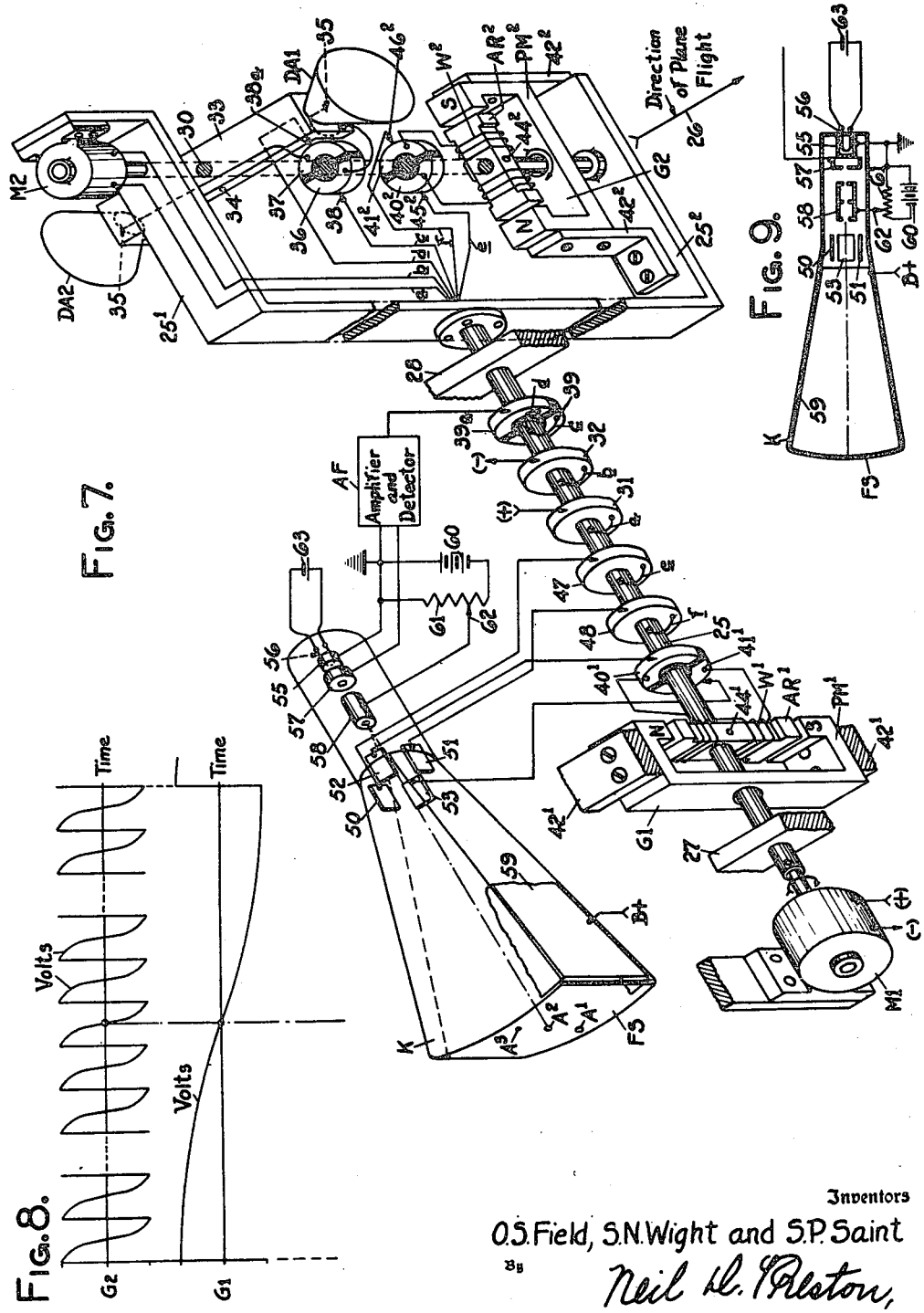
Inventors
O.S. Field, S.N. Wight and S.P. Saint
By Neil D. Preston,
Their Attorney Patented Mar. 1, 1949

2,463,094

UNITED STATES PATENT OFFICE 2,463,094

AIRPLANE COURSE INDICATING SYSTEM

Oscar S. Field and Sedgwick N. Wight, Rochester, and Samuel P. Saint, Port Washington, N. Y., assignors to General Railway Signal Company, Rochester, N. Y.

Application January 11, 1944, Serial No. 517,814

18 Claims. (Cl. 343—118)

1

The present invention relates to course indicators or describers for airplane pilots and more particularly to apparatus for indicating through fog the course an airplane is to take by indicating the course in perspective, that is, tridimensional as distinguished from apparatus for informing the pilot only whether he is to the right, to the left, or on a prescribed course.

Course indicating radio apparatus now used for informing the pilot as to whether he is on a prescribed course or route, or is to the left or to the right of such route, constitute two directional radio beams which are transmitted in slightly different directions and which overlap through a comparatively small angle together with apparatus for informing the pilot whether he is flying in the overlapped portion of the two beams (flying on the route), whether he is flying to the right or to the left of such overlap portion. This apparatus includes means for coding one of these beams to repeatedly manifest codes consisting of a dot followed by a dash (signifying the letter A) and coding the other beam with codes consisting of a dash followed by a dot (letter N) these two codes being spaced and interrelated so that the code element of one code falls in the spaces between the code elements of the other code, whereby a continuous hum or tone is received when the airplane flies directly over the course. This single tone is due to the fact that the dot and dash of one code fill the spaces between the dot and dash of the other code and the intervening space between codes.

There are numerous objections to the system of directing an airplane in flight used at present. One of the objections is that it is an audible information which interferes considerably with the pilot's reception of radio communication from the dispatcher. Another objection is that it is lineal information as distinguished from perspective or tridimensional information. A third objection is that it is difficult to keep the overlapped portion of the two radio beams on the physically prescribed ground course over which the airplane is to fly, as a result of which the entire beam swings to opposite sides of the course and therefore requires the courses to be kept further apart than should be necessary in order to prevent airplane collisions.

In accordance with the present invention, it being of course understood that a modern course indicator for airplanes must be operative through fog and clouds, it is proposed to provide ground radio transmitting stations, which transmit ultra-high frequency radio beams, at intervals and to

2 locate these radio stations so close together on a route that at least two of these radio stations are within the transmitting range of the airplane at all times except when the airplane is about to reach the end of its route.

It is further proposed to provide apparatus on the airplane which includes a fluorescent screen upon which the ground radio transmitting stations will visually appear in substantially the same relation as they would appear if the operator could see those stations during a clear day. In other words, on the fluorescent screen will appear a facsimile of the radio stations by electronic action in substantially the same way as if the pilot had a frosted glass plate for a windshield and if the radio stations comprised search lights directed at the airplane, and these search lights would appear as diffused light spots on such frosted glass plate by optical action.

More specifically, it is proposed to provide scanning apparatus on the airplane including one or more directional or focused antennae so that these antennae can repeatedly scan a suitable area ahead of the airplane and below the earth's horizon, to provide amplifying apparatus for amplifying impulses that are received by these antennae from the ground radio stations and to provide a kinescope the electron beam of which is moved over the fluorescent screen in substantial synchronism with the movement of the directional antenna over the field of view directly ahead of the airplane and which electron beam is active to affect said screen only when such antenna detects a radio transmitting station.

It is further proposed to provide gyroscopic stabilizing apparatus to hold the scanning apparatus stationary insofar as rocking or banking movement of the airplane is concerned.

Another object of the present invention resides in the provision of markings on the fluorescent screen to indicate the center line of flight so that if the pilot maneuvers his airplane to display the plurality of ground radio stations so as to be located in a straight line on this line he will be assured of flying over the ground route, a straight course being assumed. It is further proposed to provide in accordance with the invention angularly arranged lines on the fluorescent screen to give a visual indication of the angle at which an airplane is heading into the wind while flying over its course. This latter information will enable the pilot to readily determine his ground speed.

Another object of the present invention resides in the provision of suitable apparatus for distinctively coding the radio beams emitted by the varius ground stations so that the balls or spots of light on the fluorescent screen representative of these radio stations will flash in code fashion from which the pilot is informed as to which particular radio station he is approaching.

Other objects, purposes and characteristic features of the invention will in part be pointed out in the specification hereinafter and will in part be understood from the accompanying drawings in which:

Fig. 1 shows radio stations A1, A2 and A3 located at successive points on a particular ground route and also illustrates an airplane provided with radio receiving apparatus and course indicating apparatus;

Figs. 2, 3, 4, 5, and 6 illustrate various indications on the fluorescent screen of the kinescope;

Fig. 7 shows the entire receiving apparatus located on each airplane except for the housing or carrying the scanning apparatus and the stabilizing apparatus associated therewith which is shown in Fig. 10;

Fig. 8 shows graphs of the voltages generated by generators located on the scanning shafts of the scanning apparatus;

Fig. 9 shows the elements of the kinescope illustrated in Fig. 7; and

Fig. 10 shows a housing for supporting the scanning apparatus shown in Fig. 7 and shows a hydraulic motor associated therewith for stabilizing the scanning apparatus against banking and rocking of the airplane as determined by a gyroscopic stabilizer controlling said hydraulic motor.

*Structure.*—Referring to Figs. 1 to 6 of the drawings, attention is directed to the three radio ray stations A1, A2 and A3 and the airplane AP which is within reception range of these three radio transmitting stations. The three dotted lines connecting the airplanes with each of the three antennae AT each show the path over which the radiated radio beam which strikes the airplane receiver is transmitted. In Figs. 2, 3, 4, 5, and 6 have been illustrated the fluorescent screen of the kinescope which is placed directly in front of the pilot and in each of Figs. 2, 3, 4, and 5 there have been shown in perspective three lighted spots on the fluorescent screen designated $A^1$, $A^2$ and $A^3$ respectively which spots signify the corresponding wayside radio broadcasting antennae. It should be observed that the lighted spot $A^2$ (Fig. 2) is brighter than the spot $A^3$ and that the spot $A^1$ is brighter than the spot $A^2$. This is as it should be in that the strength of the radio beam striking the airplane receiver from the first antenna is stronger because the strength of the radio beam varies inversely as the square of the distance from its originating point. Also, these spots vary in size in accordance with the distance to the transmitting antenna depending in part on the resolving power of the receiving equipment.

In order to get a more clear understanding of how the three lighted spots $A^1$, $A^2$ and $A^3$ on the fluorescent screen FS should be located on this screen let us assume, for the purpose of analogy only, that the screen comprises a frosted piece of glass covering a portion of the windshield of the airplane and that the radio broadcasting stations on the ground are search lights directed toward the airplane. From this consideration it will readily appear that the three search lights located many miles apart and in a straight line in front of the airplane would appear as diffused light spots on the frosted glass and that the largest spot corresponding to the first search light on the ground would be nearest the bottom of the frosted glass, that the next more distant search light would place a spot of diffused light some distance above the first one, and that the third and most distant search light would be seen as a third but still smaller diffused light spot above the second on this frosted glass. Search lights of this type can, however, not be used because they do not penetrate fog and of course would be insufficiently visible during the daytime, and for this reason invisible radio waves which are, after reception, converted into a visible replica on the fluorescent screen of a cathode ray tube of the radio stations are used.

As already pointed out in Fig. 2 the three radio stations A1, A2 and A3 appear in a straight line above each other in that order with the spot $A^1$ near the bottom, the spot $A^3$ near the top and with the spot $A^2$ between the other two spots. If now these stations are spaced equal distances, the spot $A^1$ will be the largest and near the bottom, the spot $A^3$ will be the smallest and near the top, and the spot $A^2$ will be of medium size and nearer the spot $A^3$ than to the spot $A^1$, provided the airplane flies level on its course, or the radio receiving apparatus is stabilized as pointed out hereinafter, and is headed directly ahead on that course.

If now the airplane, although it is on the course, should be held level and be headed toward the left, the spots $A^1$, $A^2$ and $A^3$ would be shifted on the fluorescent screen FS to positions as shown in Fig. 3 not only by reason of the apparatus to be described hereinafter but this would also be the case if the fluorescent screen were a frosted piece of plate glass and the radio stations were search lights during the night time.

If the airplane were to fly on its course but headed toward the left by reason of a left to right wind, that is, if it were headed into the wind enough to counteract the effect of the wind, the airplane would still fly over its course but would not be headed in the direction of the course. In this case the three spots $A^1$, $A^2$ and $A^3$ would appear on the fluorescent screen FS in exactly the same way, namely, as shown in Fig. 3 of the drawings. It is therefore proposed to draw spreading radial lines marked in degrees each line extending upwardly from the bottom of the dotted center line 10. The pilot may then read the angle between the dotted line 10 and the line on which the three spots $A^1$, $A^2$ and $A^3$ are located and if the air speed of the airplane is multiplied by the cosine of the angle so read the resultant will be the ground speed of the airplane.

If now the airplane were a considerable distance to the left of the course defined by radio stations A1, A2 and A3, but were headed in a direction parallel to that course, in that event the three spots on the fluorescent screen FS would appear to the right of the dotted center line and substantially parallel thereto as indicated in Fig. 4 of the drawings.

Let us assume now that the airplane is so located on the ground route defined by radio stations A1, A2 and A3 as indicated in Fig. 2 of the drawings under the condition of level flying and with the airplane headed on the course. Let us now assume that the airplane is banked toward the right as it would be if the plane made a right-hand turn and let us also assume that the stabilizer described hereinafter is not used. This would cause the three light spots $A^1$, $A^2$ and $A^3$ defining the location of the radio transmitting stations to assume the positions illustrated in Fig. 5 of the drawings. In other words, the axis about which the airplane banks lines up substantially with the most distant radio station so that this distant station remains substantially stationary on the screen. In Fig. 6 has been illustrated a replica of a second route B including transmitters illustrated by spots $B^1$, $B^2$, $B^4$ and $B^5$ crossing the first mentioned route A. In order to avoid a change in indication due to banking of an airplane the radio pick-up apparatus shown in Fig. 7 and which will be described hereinafter and which is located in the scanning mechanism casing 24 shown in Fig. 10 must be stabilized by a suitable gyroscopic stabilizer. Such a stabilizer has been shown at 11 in Fig. 10 of the drawings. The scanning mechanism casing 24 (see Fig. 10) is mounted on a shaft 12, the axis of which is in the direction of the motion of the airplane and which is substantially level when the airplane flies horizontally, so to speak. This shaft 12 is supported by bearings 13 and 14 and is provided with a pinion 15. The hydraulic motor, well known in the art of stabilization of airplanes by a gyroscopic stabilizer, has been conventionally shown as a cylinder 16 provided with a piston 17, which through the medium of a piston rod 18, slidably mounted in a bearing block 20, and a rack 19 may operate the pinion 15 and thereby rock the scanning mechanism casing 24 about the axis of the shaft 12 in one direction or another depending upon the direction of banking and the resulting direction of motion of such piston 17. Fluid pipes 21 and 22 connect the piston 16 to the stabilizer 11 so that the hydraulic controller of the stabilizer 11 will maintain the scanning mechanism on an even keel in spite of banking of the airplane.

We have thus far discussed only the results to be accomplished by the apparatus shown in Fig. 7 and it is now proposed to specifically discuss the apparatus whereby the radio way stations are visually reproduced pictorially on a fluorescent screen of the kinescope shown in Fig. 7 of the drawings. In accordance with the present invention it is proposed to radio responsively scan the field of view below the horizon and directly ahead of the airplane mechanically and at very high speed. By reason of the extremely high speed scanning that is contemplated it is deemed impracticable to scan the field of view by oscillating apparatus and for this reason it is proposed to employ rotating apparatus which rotates at a comparatively high speed about one axis and also rotates at a much higher speed about an axis displaced 90° with respect to such one axis.

In the particular embodiment of the invention illustrated, although other forms of scanning apparatus may, of course, be used, the scanning apparatus includes a main shaft 25 which is positioned horizontally with respect to the airplane and at right angles to the direction of movement of such airplane. In other words, the scanning apparatus illustrated is so oriented with respect to the direction of airplane flight as indicated by its oriented relation to the arrow 26 (see Fig. 7) that high speed horizontal and low speed vertical scanning is accomplished.

The shaft 25 is supported by fixed bearings 27 and 28. One end of this shaft 25 is driven by a motor M1 and the other end of this shaft is bifurcated to form a fork $25^1$ and $25^2$ which fork constitutes rotating bearings for a second shaft 30 having its axis substantially at right angles to the shaft 25 and supporting two directional radio receiving antennae DA1 and DA2. This shaft 30 is driven by another motor M2 which receives its energy through wires $a$ and $b$ and slip rings 31 and 32 on shaft 25. To the shaft 30 is pinned a U-shaped member 33 as by a pin 34 which supports the directional radio antennae DA1 and DA2 in such a manner that the axis of these radio antennae DA1 and DA2 are substantially at right angles to the shaft 30 and displaced about the shaft at an angle of 180 degrees. These antennae DA1 and DA2 comprise parabolic metallic reflectors which have an antenna element 35 located in the focus thereof. These antennae elements 35 are connected to two segments 36 and 37 of a commutator. This commutator is engaged by brushes 38 or 38a in such manner that only the forwardly directed antenna DA1 or DA2 will be electrically connected to the proper contact brush 38 or 38a. These contact brushes 38 and 38a are in turn connected to the input side of the amplifier-detector unit AF through the medium of wires $c$ and $d$ and commutator 39—39a. It should be observed that if we assume the shaft 30 to be stationary in fork $25^1$—$25^2$ that the connections to the antennae DA1 and DA2 must be commutated with respect to rotation of shaft 25 and it is for this reason that commutator 39—39a is provided.

From this construction it is readily seen that only the reflector disposed to the front of the airplane will be electrically connected to the amplifier-detector, and it is further readily seen that upon high speed rotation of the shaft 30 the focal lines of the reflectors DA1 and DA2 will describe substantially horizontal lines one above another the spacing between these lines depending upon the ratio of speeds of rotation of the shafts 25 and 30. In other words, if the shaft 30 rotates 16 times while the shaft 25 rotates a half-revolution, 32 horizontal lines will be scanned over the field for each frame of observation or each half-revolution of the shaft 25. It will also readily be seen that when the shaft 25 has been rotated 90° from the position shown, namely, has rotated to a position where the shaft 30 is horizontal the directional antenna DA1 will come out of view of the field of vision ahead of the airplane and the directional antenna DA2 will enter such field so that another 32 lines may be scanned by the antenna DA2. This makes a total of 64 lines of scanning per revolution of the shaft 25. Also, as the antenna DA1 passes out of the field of vision the brushes 38 and 38a pole change on segments 36 and 37. In this connection it should be understood that if it is desired to scan only below the horizon and if it is desired to only scan a horizontal distance of 45° to the right of the course of the plane and 45° to the left of the course of the plane, namely, if it is desired to scan an area of 90° by 90° two more directional antennae DA placed at right angles to the two illustrated would be employed in which event four pole generators instead of two pole generators, to be described hereinafter, would be required to be employed. In this case the commutator 36—37 would be required to be a four segment commutator.

The shaft 25 is provided with a two pole generator G1 and the shaft 30 is provided with a two pole generator G2. Since these generators are identical, like parts will be designated by like reference characters having distinctive exponents and only one of these generators will be described. Referring to the generator G2 associated with the high speed shaft 30 this generator comprises a ermanent magnet field magnet PM² supported n one leg 25² of the fork 25¹—25² by brackets ²², between the north pole N and the south pole of which is supported a soft iron laminated rmature AR² secured to the shaft 30 as by a pin ². On this armature AR² is provided a winding 7² which has one end electrically connected to he commutator segment 40² and has its other d electrically connected to the commutator gment 41². Stationary brushes 45² and 46² displaced 180° about the shaft 30 engage the commutator 40²—41². These brushes are so oriented ith respect to the field magnet PM² that commutation from one segment to another, or pole hanging of the wires e and f leading from the rmature winding W2 and connected to slip ings 47 and 48 takes place when there is substantially zero flux in the armature AR². In ther words, these generators G2 and G1 do not eliver direct current as is usually the case of enerators of similar construction because they ommutate the current at the maximum voltage alue rather than at zero voltage value as is customarily done. The voltage delivered at the rushes therefore are of wave form substantially s illustrated in Fig. 8 of the drawings.

In the upper part of Fig. 8 has been graphically lustrated the voltage fluctuation of the voltage elivered at the brushes 40² and 41² of the generator G2, and similarly, the lower portion of Fig. of the drawings shows a voltage graph of the oltage delivered by the generator G1 during one omplete rotation of the shaft 25. Since the commutator 36—37 and the commutator 40²—41² perorm their commutating function at the same me it will be seen that the voltage delivered by he generator G2 is of maximum plus value when new focused antenna enters the field and that his voltage is of maximum minus value when uch focused antenna leaves the field which is eing scanned. The voltages delivered by these enerators are used to deflect the electron beam f the kinescope all in a manner as hereinafter ore fully described. The voltage graph for generator G² has been shown partly omitted (see otted lines). This has been done to illustrate hat there are more cycles generated by generator ² for each cycle generated by generator G1 han are actually illustrated.

The cathode-ray tube K, commercially known s a kinescope and illustrated in the upper left art of Fig. 7 and in Fig. 9 of the drawings is of ell-known construction and is employed to visally indicate on a fluorescent screen the pictorial ocation of one or more of the ground located adio transmitting antennae. Cathode-ray tubes f this construction are well known in the art for hich reason the kinescope K has been illustrated ather conventionally. This kinescope comprises fluorescent screen FS, also shown in Figs. 2, 3, 5 and 6, over which an electron beam is adapted o sweep in a manner to be described hereinafter. This electron beam has been shown at two different positions by a dotted line and by a dot nd dash line. The electron beam is located in he position as shown by the dotted line when he sweep voltage delivered by the generator G2 s of maximum plus value and the sweep voltage elivered by the generator G1 is also of maximum lus value, as shown at the extreme left-hand ortion of Fig. 8 of the drawings where the dotted ine below the drawing signifies that these are the oltages employed to swing the electron beam to he dotted line position shown in Fig. 7.

Referring again to Fig. 8 it will be seen that a dot and dash line has been shown at that point in the voltage graphs where the voltage of both generators are zero. Under this condition of sweep voltages the electron beam of Fig. 7 will assume a neutral position as shown by the dot and dash line. This swing of the electron beam is accomplished by horizontally located sweep plates 50 and 51 connected to the high speed generator G2 and by the vertically located sweep plates 52 and 53 connected to the brushes of the low speed generator G1. As is well known by those skilled in the art the electrons are emitted by the heater or cathode 55 which is heated by a filament 56 as through the medium of a battery 63. The electrons emitted by the cathode 55 may be controlled by a grid or controlling element 57 and may be brought to a sharp focus by the focusing or anode structure 58. A second anode 59 is provided on the inner surface of the tapered portion of the cathode-ray tube to accelerate the electrons after the grid or control element 57 has once allowed these electrons to be emitted. As illustrated the focusing structure or first anode 58 has a potential applied thereto through the medium of the battery 60 and a potentiometer 61, so that by adjusting the slide contact 62 of this potentiometer the electron beam may be focused so as to concentrate the electrons into as narrow a beam as desired. These various elements of the kinescope K have been illustrated in section in Fig. 9 of the drawings. It should be understood that the cathode 55, the grid 57 and the anode 59 constitute the so-called electron gun whereas the cathode 58 is the optical system for focusing the electron beam into a narrow stream. The screen FS may also be called the target.

Referring now to Fig. 8, it will be seen from the voltage graph that the voltage of the generator G2 falls from a maximum plus value to a maximum minus value repeatedly many times during one such change from maximum plus value to maximum minus value of the voltage generated by the generator G1. In practice there may be 32 or more or less cycles of voltage generated by the generator G2 for each cycle of voltage generated by the generator G1. In other words, there may be 32 or more or less horizontal lines of sweep of the electron beam for each repetition of scanning of the fluorescent screen FS. In this connection it may be pointed out that the various wiring connections are so made, the number of turns and voltages are so chosen that the electron beam will be located in the upper left-hand corner of the fluorescent screen FS as viewed by the pilot when a focused directional antenna enters the field of view at the upper left-hand corner of the field to be scanned as in the case when each of the commutators 36—37 and 40²—41² make a new connection immediately following a new connection made between the segments of the commutators 39—39a and 40¹—41¹ and their respective brushes. Continued rotation of the shafts 25 and 30 in the direction indicated by arrows applied to these shafts cause the electron beam to sweep from left to right over the fluorescent screen and for each sweep the electron beam is dropped a small amount as determined by the voltage change as shown in the lower part of Fig. 8 of the drawings. When the voltage generated by the generator G1 has fallen to a maximum minus value a complete scanning of fluorescent screen has been completed at the lower right-hand corner of the screen and this voltage abruptly rises to a maximum plus value to start another complete scanning of the fluorescent screen in the upper left-hand corner. In practice, if the fluorescent screen should be scanned 16 times per second, the speed or rotation of the shaft 25 will be 8 revolutions per second. If it is proposed to produce a 32 line image, that is, scan the electron beam from left to right over the fluorescent screen 32 times for each movement of the electron beam from top to bottom on the fluorescent screen FS, then the shaft 30 must rotate 32 times as fast as the shaft 25. If the shaft 25 rotates 8 revolutions per second or 480 R. P. M. then the shaft 30 must rotate 480×32 or 15,360 R. P. M.

In view of the gyroscopic action produced by rotating a high speed rotated body at substantially right angles to its axis of rotation it is proposed to make the motor M2 as well as the directional antennae DA1 and DA2 and the generator G2 as small and light as possible, this in order to reduce the forces of gyroscopic action. In this connection it is desired to point out that the shaft 30 may be rotated at the low speed and the shaft 25 may be rotated at the high speed. In this case the scanning lines on the fluorescent screen will be vertical and running from top to bottom the lines starting at the left side and finishing at the right. Different directions of scanning may, of course, be accomplished by properly orienting the scanning mechanism in the housing 24 and by making the proper circuit connections. Also, the shaft 30 may be driven by a gear mechanism, if desired, to avoid the mounting of the motor M2 on a rotating body and to thereby reduce the forces of gyroscopic action which such motor M2 produces.

Thus far very little has been said about the construction of the ground located radio transmitting stations A1, A2 and A3. Each of these transmitting stations includes a transmitter UHF which transmits through the medium of its antenna AT an ultra-high frequency radio emission. For convenience, like parts have been given like reference numbers with distinctive exponents. In order to visually indicate directly on the fluorescent screen FS what particular radio station is visually displayed thereon, it is proposed to code the radio beam to a particular code characteristic of that station. For instance, the particular air route under consideration may be designated the route A and each of the stations may be distinguished by a number, so that the first station A1 illustrated in Fig. 1 would naturally be coded by the necessary dots and dashes to signify the letter "A" followed by the numeral "1" where a dot followed by a dash signifies the letter "A" and a dot followed by two dashes followed by another dot signifies the numeral "1." In order to obtain such coding a code wheel 70 is provided for each station preferably driven by a motor 71 and having teeth arranged thereon to code the particular letter and numeral signifying that station. Each of the code wheels 70 has the proper arrangement of teeth cut therein to transmit the code for that station, the code letter and code numeral, as well as the dots and dashes to characterize such letter and numeral, has been indicated directly over each of the code wheels 70 illustrated in Fig. 1. By this construction the dots of illumination signifying these various radio stations will be flashed in code fashion which can be readily read and decoded in the mind of the pilot.

*Operation.*—Let us now observe how the airplane flying over the ground route defined by radio stations A1, A2 and A3 and which is about to approach the station A1 with stations A2 and A3 in advance of such station A1, it will be understood that each time that a focused directional antenna DA1 or DA2 on the airplane points directly at a radio station on the ground the electron beam in the kinescope will point at a position on the fluorescent screen FS corresponding to the point on the ground where such radio station is located. This is true because the sweep plates 50 and 51 will have potentials applied thereto from the generator G2 precisely in synchronism with the movement of the directional antennae DA1 and DA2 from left to right and the electron beam will be swept from top to bottom at a much slower rate by voltages applied to the sweep plates 52 and 53 delivered by the generator G1 which voltage is exactly in synchronism with the dropping of the focal axis of the directional antenna DA1 and DA2 as the shaft 25 is rotated in the direction of the arrow.

We have now pointed out how the electron beam in the kinescope is directed in synchronism with the direction of the focal axis of the antennae DA1 and DA2 so that whatever is detected by a focused antenna will be detected when the electron beam in the kinescope assumes a corresponding directional position in the kinescope. Furthermore, the directional antenna DA1 or DA2 will only receive radio response from a field station when its focal axis points directly at such radio station. Such reception of a radio impulse on the antenna element 35 in reflectors of the directional antennae DA1 and DA2 will be conducted through the medium of the commutators 36—37 and 39—39a to the lead-in wire of the amplifier and detector AF. The impulse will then be amplified and detected and will create and deliver a potential on the grid or controlling element 57 of the electron gun to cause electrons to be present in volume in the electron beam. In other words, although a swaying electron beam has been mentioned in the past it should be understood that this electron beam is imaginary or at least weak except when the grid or control element 57 of the electron gun has a potential applied thereto. In other words, electrons will impinge upon the fluorescent screen FS only at the scanned points where the scanning directional antenna picks up a radio beam of the proper carrier frequency. From this construction and functioning it is readily understood that three spots $A^1$, $A^2$ and $A^3$ of coded light will appear on the fluorescent screen FS at positions as illustrated in Figs. 2, 3, 4, 5 and 6 under the conditions described in connection with these figures.

It should be understood that it is contemplated that the ground route defined by radio stations A1, A2 and A3 is to be used for one direction of traffic only and that a similar row of radio stations may be used for directing airplanes moving in the opposite direction. It is contemplated that these routes be arranged side by side and more or less parallel and that they may be spaced from three to five miles apart or at some other suitable distance. If routes governing airplane movement in opposite directions are arranged parallel to each other it may be desirable to make the antennae of the ground located radio transmitting stations directional so that the beams for, say eastbound traffic, cannot reach airplanes moving in an opposite, say westbound, direction. Also, although apparatus has been conventionally illustrated in Fig. 10 to show how the scanning mechanism of the receiver carried by the airplane may be held level, insofar as banking of an airplane is concerned, through the medium of a gyroscopic stabilizer and associated hydraulic operating equipment, this stabilizing apparatus may be omitted if desired. It should also be understood that the radial lines proposed on the fluorescent screen heretofore mentioned may, if desired, be dispensed with. Also, since a speed of 15,360 R. P. M. for the shaft 30 may be intolerable by reason of the gyroscopic action and forces that will be involved, the practitioner of the invention may, if he desires, construct the fluorescent screen to have a persistence of fluorescence so as to render the image on the fluorescent screen substantially continuous, except for the codes superimposed upon the radio beams, even though the fluorescent screen is scanned at less than 16 times per second. In this connection it should be understood that the fluorescent screen must not be so slow in losing the visual image superimposed thereon that the code signifying the particular way station cannot be detected. Also, the speed of scanning must be sufficiently fast, or the code sufficiently slow, that the dots of the code of the letter N, for instance, will be scanned at least a plurality of times in order to be sure that the codes which characterize the way station will be completely reproduced on the fluorescent screen.

The present invention constitutes a new and useful combination of elements many of which are old and it should be understood that equivalent elements may be used in place thereof. For instance, it should be understood that suitable other forms of scanning apparatus may be used if desired in place of the specific scanning apparatus illustrated and similarly other arrangements for deflecting the electron beam, which may be deflected either statically, as illustrated, or electro-magnetically, may be used if desired.

Having thus shown one rather specific embodiment of the present invention it should be understood that the invention may take various forms and that various changes, modifications and additions may be made without departing from the spirit or scope of this invention, so long as the general combinations of elements as defined by the scope of the following claims are employed.

What we claim as new is:

1. In a radio course indicating system for airplanes, the combination with a plurality of distinctive radio code creating apparatuses on the ground arranged along the ground to define the course over which an airplane is to fly, a cathode ray responsive display area supported within view of the pilot on such airplane, a scanning antenna on the airplane scanning continuously horizontally and vertically at different rates, gyroscopic means for stabilizing said antenna with respect to orientation of the airplane about its longitudinal axis, and radio responsive means coupled to said antenna for displaying cathode ray images of said apparatuses on said display area by a plurality of lighted coded spots one for each apparatus and so juxtaposed as are the lines of sight connecting such airplane and apparatuses and each spot blinking in accordance with the distinctive code assigned to that apparatus.

2. In an airway traffic course indicating system, in combination with a plurality of spaced ground stations arranged to define an air route, means at each station for transmitting radiant energy not perceptible to the sense of sight and each coded to define that station, airplane carried means for directionally and distinctively receiving energy from the plurality of stations and including means for transforming the received energy into energy perceptible to sight on a cathode ray screen in the form of a replica of the plurality of ground stations in their properly spaced relationship and each station replica blinking in accordance with the distinctive code assigned to that station, and stabilizing means on the airplane whereby said replica maintains its same relative positions on said screen irrespective of orientation of the aircraft about its longitudinal axis.

3. In an airway traffic course indicating system, in combination with a plurality of spaced ground stations arranged to define an air route, means at each station for transmitting distinctively coded energy of a type not perceptible to the senses, airplane carried means including a scanning antenna for directionally and distinctively receiving energy from the plurality of stations and including means for transforming the received energy into energy perceptible to sight in the form of a replica of the plurality of ground stations in their properly spaced relationship and each station replica blinking in accordance with the coded energy emitted by the corresponding ground station, and stabilizing means on the airplane for stabilizing said antenna with respect to orientation of the airplane about its longitudinal axis.

4. In an airway traffic course indicating system, in combination with a plurality of spaced ground stations arranged to define a plurality of air routes, means at each station for transmitting distinctively coded energy of a type not perceptible to the senses, airplane carried means including a scanning antenna for directionally and distinctively receiving energy from the plurality of stations and including means for transforming the received energy into energy perceptible to sight in the form of a replica of the plurality of ground stations in their properly spaced relationship so as to pictorially display such routes and each station replica blinking in accordance with the coded energy emitted by the corresponding ground station, and means for stabilizing said antenna with respect to orientation of the airplane about its longitudinal axis.

5. In a course indicating system for airplanes; the combination with a plurality of radio transmitting stations arranged along the ground to define a route over which airplanes are to fly; a cathode ray tube having an electron gun, electron beam deflecting devices and a fluorescent screen carried by an airplane; of other airplane carried apparatus including mechanically rotated radio responsive scanning means rotated through complete revolutions and about a continually changing axis, means including electric current generators rotated through complete revolutions and in synchronism with said scanning means for controlling said deflecting devices in synchronism with said scanning means and generating scanning voltages of saw-tooth wave form, means for rendering said electron gun effective when said scanning means receives radio impulses from transmitting stations as such stations are scanned by said scanning means during the movement of said airplane to display on said screen a facsimile of said stations, and means for stabilizing said scanning means with respect to orientation of the airplane about its longitudinal axis.

6. Scanning apparatus comprising, a first shaft terminating into a bifurcated end, bearings for supporting said shaft for rotation, bearings supported by the bifurcated end of said first shaft, a second shaft supported in bearings in said bifurcated end so as to have its axis substantially at right angles to the axis of said first shaft, means for rotating said shafts at speeds such that the speed of one shaft is many times the speed of the other shaft, a focused antenna supported by said second shaft so that its focal axis is substantially at right angles to the axis of such second shaft, and two electrical generators one driven at a speed proportional to the speed of one of said shafts and the other driven at a speed proportional to the speed of the other of said shafts for generating scanning voltages of saw-tooth wave form.

7. Scanning apparatus comprising, a first shaft terminating into a bifurcated end, bearings for supporting said shaft for rotation, bearings supported by the bifurcated end of said first shaft, a second shaft supported in bearings in said bifurcated end so as to have its axis substantially at right angles to the axis of said first shaft, means for rotating said shafts at speeds such that the speed of one shaft is many times the speed of the other shaft, a focused antenna supported by said second shaft so that its focal axis is substantially at right angles to the axis of such second shaft, and a gyroscopically controlled motor for stabilizing said apparatus about an axis substantially at right angles to said first shaft.

8. In combination, a directional antenna, a shaft for rotating said antenna, bearings so supporting said shaft and antenna that the direction of reception of said antenna is substantially at right angles to the axis of said shaft, another shaft for bodily supporting said bearings and said first mentioned shaft, so that the axis of said first mentioned shaft is substantially at right angles to the axis of said another shaft, bearings for supporting said another shaft, means for driving said shafts at speeds such that the speed of one of said shafts is many times that of the speed of the other, and electromagnetic means for generating scanning voltages of frequencies proportional to the speeds of rotation of said shafts and of saw-tooth wave form to produce uni-directional scanning.

9. In a course indicating system for airplanes, the combination with a plurality of radio transmitting stations arranged in a row on the ground to define an air route over which airplanes are to travel, a cathode ray tube on an airplane including a fluorescent screen and an electron gun, scanning apparatus for radio responsively scanning the field of view ahead of such airplane, means including a gyroscope for stabilizing said scanning apparatus against rocking and banking motion of said airplane, and means for rendering said electron gun active each instant said scanning apparatus detects a radio transmitting station and for directing the electrons emitted by said gun to a point on said screen conforming to the location in the field where the radio transmitting station which activated said gun is located.

10. In a course indicating system for airplanes, the combination with a plurality of radio transmitting stations arranged in a row on the ground to define an air route over which airplanes are to travel, coding means for each station for distinctively coding the radio waves emitted by such station, a cathode ray tube on an airplane including a fluorescent screen and an electron gun, scanning apparatus for radio responsively scanning the field of view ahead of such airplane, means for rendering said electron gun active each instant said scanning apparatus detects a radio transmitting station and for directing the electrons emitted by said gun to a point on said screen conforming to the direction in which said scanning means is directed and to the location in the field where the radio transmitting station which activated said gun is located, whereby the pilot is informed by a replica in perspective of the ground route and its radio stations and whereby these stations can be specifically identified by the flashing in code of each spot on the screen characterizing a particular radio station, and gyroscopic means for stabilizing said scanning apparatus relative to movement of the airplane about its longitudinal axis.

11. In a course indicating system for airplanes, the combination with a plurality of radio transmitting stations arranged in a row on the ground to define an air route over which air planes are to travel, coding means for each station for distinctively coding the radio waves emitted by such station, a cathode ray tube on an airplane including a fluorescent screen and an electron gun, scanning apparatus for radio responsively scanning the field of view ahead of such airplane, means including a gyroscope for stabilizing said scanning apparatus against rocking and banking motion of said airplane, means for rendering said electron gun active each instant said scanning apparatus detects a radio transmitting station and for directing the electrons emitted by said gun to a point on said screen conforming to the location in the field then scanned by said antenna and where the radio transmitting station which activated said gun is located, whereby the pilot is informed by a replica in perspective of the ground route and its radio stations and whereby these stations can be specifically identified by the flashing in code of each spot on the screen characterizing a particular radio station, and gyroscopic means for stabilizing said scanning apparatus relative to movement of the airplane about its longitudinal axis.

12. In a course indicating system for airplanes, the combination with a plurality of radio transmitting stations arranged along a path on the ground to define an air route over which airplanes are to travel, a cathode-ray tube on an airplane and including a fluorescent screen and an electron gun, scanning apparatus for radio responsively scanning the field of view ahead of such airplane only and scanning such field repeatedly, continuously and uni-directionally, and sweep means associated with said tube including sweep voltage creating means operated in synchronism with said scanning means to cause sweeping of the electron stream emitted by said gun uni-directionally over said screen in exactly the same manner as said scanning apparatus scans the field of view ahead of such airplane uni-directionally and in synchronism therewith, said scanning apparatus including two directional antennas having their focal axis substantially one hundred and eighty degrees apart and also including means for rendering said antennas alternately effective, whereby hemispheres are scanned in space in synchronism with the scanning of said screen repeatedly without intervening loss of time, and stabilizing means on the airplane for rendering said scanning apparatus stabilized with respect to orientation of the airplane about its longitudinal axis.

13. In a course indicating system for airplanes, the combination with a plurality of radio transmitting stations arranged along a path on the ground to define an air route over which airplanes are to travel, a cathode-ray tube on an airplane and including a fluorescent screen and an electron gun, scanning apparatus for radio responsively scanning the field of view ahead of such airplane only and repeatedly and uni-directionally so as to have each scan line follow immediately the next preceding scan line, sweep means associated with said tube including sweep voltage creating means operated in synchronism with said scanning means to cause sweeping of the electron stream emitted by said gun uni-directionally over said screen in exactly the same manner as said scanning apparatus scans the field of view ahead of such airplane uni-directionally and in synchronism therewith, said scanning apparatus including two directional antennas having their focal axis substantially one hundred and eighty degrees apart and also including means for rendering said antennas alternately effective, whereby hemispheres are scanned in space in synchronism with the scanning of said screen repeatedly without intervening loss of time, and gyroscopically controlled means for stabilizing said scanning apparatus against rocking and banking due to rocking and banking of such airplane.

14. In combination, two directional antennas supported by a first shaft so that their focal axis are displaced substantially one hundred and eighty degrees and both substantially at right angle to said shaft, a first bearing supporting said first shaft for rotation, a second bearing, a second shaft supported for rotation in said second bearing and supporting said first bearing in a manner so that the first shaft is at all times substantially at right angle to said second shaft, means for driving said shafts at speeds such that the speed of one of said shafts is many times that of the speed of the other shaft, a two-segment commutator on said first shaft, a two-segment commutator on said second shaft, two brushes supported by said second shaft and engaging said commutator on said first shaft at points displaced substantially one hundred and eighty degrees and individually connected to the respective segments of the commutator on said second shaft, a single fixed brush engaging the commutator on said second shaft, and a cathode-ray tube having its grid controlled by energy derived from said antennas through the medium of said commutators.

15. In combination, two directional antennas supported by a first shaft so that their focal axis are displaced substantially one hundred and eighty degrees and both substantially at right angle to said shaft, a first bearing supporting said first shaft for rotation, a second bearing, a second shaft supported for rotation in said second bearing and supporting said first bearing in a manner so that the first shaft is at all times substantially at right angle to said second shaft, means for driving said shafts by separate motors at speeds such that the speed of one of said shafts is many times that of the speed of the other shaft the motor driving said first shaft being supported by said second shaft, a two-segment commutator on said first shaft, a two-segment commutator on said second shaft, two brushes supported by said second shaft and engaging said commutator on said first shaft at points displaced substantially one hundred and eighty degrees and individually connected to the respective segments of the commutator on said second shaft, a single fixed brush engaging the commutator on said second shaft, and a cathode-ray tube having its grid controlled by energy derived from said antennas through the medium of said commutators.

16. In combination, two directional antennas supported by a first shaft so that their focal axis are displaced substantially one hundred and eighty degrees and both substantially at right angle to said shaft, a first bearing supporting said first shaft for rotation, a second bearing, a second shaft supported for rotation in said second bearing and supporting said first bearing in a manner so that the first shaft is at all times substantially at right angle to said second shaft, means for driving said shafts at speeds such that the speed of one of said shafts is many times that of the speed of the other shaft, a two-segment commutator on said first shaft, a two-segment commutator on said second shaft, two brushes supported by said second shaft and engaging said commutator on said first shaft at points displaced substantially one hundred and eighty degrees and individually connected to the respective segments of the commutator on said second shaft, a single fixed brush engaging the commutator on said second shaft, a cathode-ray tube having its grid controlled by energy derived from said antennas through the medium of said commutators, and gyroscopically controlled means for stabilizing said second bearing against rocking and banking due to rocking and banking of such airplane.

17. In combination, a plurality of directional antennas supported by a first shaft so that their focal axis are displaced substantially equal angles apart and all substantially at right angle to said shaft, a first bearing supporting said first shaft for rotation, a second bearing, a second shaft supported for rotation in said second bearing and supporting said first bearing in a manner so that the first shaft is at all times substantially at right angle to said second shaft, means for driving said shafts at speeds such that the speed of one of said shafts is many times that of the speed of the other shaft, a multi-segment commutator on said first shaft, a two-segment commutator on said second shaft, two brushes supported by said second shaft one for each segment of the commutator on said second shaft and engaging said commutator on said first shaft at poitns displaced substantially one hundred and eighty degrees and individually connected to the respective segments of the commutator on said second shaft, a single fixed brush engaging the commutator on said second shaft, and a cathode-ray tube having its grid controlled by energy derived from said antennas through the medium of said commutators.

18. In a course indicating system for guiding airplanes over a course; the combination with a plurality of radio transmitting stations arranged along a path on the ground to define an air route over which airplanes are to travel; an airplane carried cathode-ray tube including a grid, a fluorescent screen and an electron gun; scanning apparatus for tridimensionally and radio responsively scanning the field of view ahead of such airplane including a first rotating shaft, a second rotating shaft mounted transversely on said first rotating shaft, means for rotating said shafts at different speeds and a plurality of focused antennas mounted on said second shaft with their focal axis arranged transversely to the axis of such second shaft; means for rendering said focused antennas effective one at a time; means for conducting energy from said focused antennas to the grid of said cathode-ray tube; and saw-tooth voltage generators, one for each shaft, each operated at a speed proportional to the speed of its associated shaft for causing tridimensional scanning of said screen by an electron stream emitted by said electron gun.

OSCAR S. FIELD.
SEDGWICK N. WIGHT.
SAMUEL P. SAINT.

REFERENCES CITED

The following references are of record in the file of this patent:

UNITED STATES PATENTS

| Number | Name | Date |
|---|---|---|
| 1,525,783 | Trenor | Feb. 10, 1925 |
| 1,806,577 | Kolster | May 19, 1931 |
| 1,885,023 | Dieckmann | Oct. 25, 1932 |
| 2,130,913 | Tolson | Sept. 20, 1938 |
| 2,151,549 | Becker | Mar. 21, 1939 |
| 2,201,174 | Harding et al. | May 21, 1940 |
| 2,226,860 | Grieg | Dec. 31, 1940 |
| 2,231,929 | Lyman | Feb. 18, 1941 |
| 2,252,083 | Luck | Aug. 12, 1941 |
| 2,279,246 | Podliasky et al. | Apr. 7, 1942 |
| 2,288,102 | Meredith | June 30, 1942 |
| 2,366,939 | Smith et al. | Jan. 9, 1945 |
| 2,396,112 | Morgan | Mar. 5, 1946 |